United States Patent [19]
Tollum

[11] Patent Number: 5,388,011
[45] Date of Patent: Feb. 7, 1995

[54] PEAK DETECTOR WITH LOOK AHEAD

[75] Inventor: Ronald E. Tollum, Simi Valley, Calif.

[73] Assignee: Wangtek, Inc., Simi Valley, Calif.

[21] Appl. No.: 234,507

[22] Filed: Apr. 28, 1994

Related U.S. Application Data

[63] Continuation of Ser. No. 886,540, May 20, 1992, abandoned.

[51] Int. Cl.6 .......................... G11B 5/09; G11B 5/02
[52] U.S. Cl. .................................. 360/46; 360/55; 360/45
[58] Field of Search .................. 360/45, 46, 51, 32, 360/55; 375/102, 110

[56] References Cited

U.S. PATENT DOCUMENTS

| | | | |
|---|---|---|---|
| 4,480,276 | 10/1984 | Batey et al. | 360/45 X |
| 4,724,496 | 2/1988 | White | 360/46 |
| 4,979,189 | 12/1990 | Wile | 360/51 |
| 4,987,500 | 1/1991 | Bizjak et al. | 360/46 |

*Primary Examiner*—Donald Hajec
*Assistant Examiner*—T. N. Forbus, Jr.
*Attorney, Agent, or Firm*—Robbins, Berliner & Carson

[57] ABSTRACT

A look ahead detector based on a delay line is used in a pulse amplitude qualifier circuit to qualify detected peaks in a system for the recovery of magnetically recorded digital information. The analog signal is delayed by one cell period to create a delayed replica which is applied to the peak detector. The difference between the analog signal and the delayed replica is applied to a hysteresis flip flop to create a qualifying signal based on a threshold value proportional to the analog signal to gate the peak detected in the delayed replica.

17 Claims, 2 Drawing Sheets

PEAK DETECTOR WITH LOOK AHEAD

This is a continuation application of Ser. No. 08/886,540 filed on May 20, 1992, now abandoned.

BACKGROUND OF THE INVENTION

1. Field of the Invention

This invention relates generally to techniques for detecting flux transitions from magnetic media, typically for the recovery of magnetically recordable digital information from such media and more particularly relates to improvements in qualifying techniques for enhancing the accuracy and reliability of the recovery of magnetically recorded digital information.

2. Description of the Prior Art

Digital data is conventionally stored on magnetic media in the form of flux transitions on the surface of the media. Data recovery consists of determining the presence, and relative timing, of such flux transitions. As the density of the storage of digital information on magnetic surfaces continues to increase, it has become more difficult to accurately and reliably determine the presence or absence of such flux transitions because of the decreasing magnitude and quality of the analog readout waveform.

The spacing of the flux transitions encodes the data being recorded. The read head detects these transitions to provide positive and negative pulses corresponding to the flux transitions on the media, that is, the sudden reversals of the magnetic field. The signals produced by the read head in response to such transitions are low amplitude and include noise and/or other unwanted signals. Such read head signals are therefore amplified and filtered before peak detection. The filtering is intended to enhance the quality of the signals, representing the flux transitions to be detected, and attenuate the unwanted noise.

In the ideal system, a Read Data Pulse (RDP) would then be detected in the amplified and filtered output of the read head for each actual flux transition in the media. As the requirement for higher density recording formats continues to increase, however, it has become more difficult to faithfully distinguish between genuine RDP's, representing actual flux transitions in the media, and bogus or spurious RDP's which result from other causes, such as noise.

One improvement in flux transition detection has been the development of pulse amplitude qualifying circuits to aid in distinguishing genuine from spurious RDP's based on amplitude. In conventional pulse amplitude qualifying systems, the analog signal from the read head is applied to a peak detector to produce a signal including genuine RDPs. The peak detector output also may contain spurious RDPs resulting from noise or other unwanted signals.

In addition, the analog signal from the read head is rectified to produce a slowly varying DC voltage level proportional to the peaks being detected. The proportionality is typically controlled by a level set circuit at about 50% of the peak amplitude. The level set circuit includes a time constant circuit which permits the DC voltage level to change slowly in accordance with changes in the genuine peak amplitudes in the analog signal due, for example, to a loss in amplitude of the analog signal.

The decay rate is typically about 10% per minimum time interval, that is, about 10% of the time interval between two flux transitions in the magnetic media spaced as closely as permitted by the particular coding scheme being used. The decay rate permits the peak detector to operate properly even during dropouts when the analog signal drops to a lower level. Such dropouts often last for 50 to 200 microseconds and may reduce the analog signal amplitude by as much as 25% or more.

The slowly varying DC voltage level is applied to a hysteresis flip flop to create positive and negative threshold values. The analog signal from the read head is applied to the hysteresis flip flop to produce an output level change whenever the analog read head signal exceeds the appropriate positive or negative threshold value. The output level change is then applied to the signal input of a clocked flip flop while the peak detector output provides the clock pulse so that the timing of the output of the clocked flip flop is controlled by the detected peaks, but qualified by the output of the hysteresis flip flop. The output of the clocked flip flop may then be applied to a bi-directional one shot to produce a conditioned pulse representing genuine RDPs.

In other words, in a conventional amplitude pulse qualifying circuit, a DC voltage set to a controllable proportion of the recent amplitude of the peaks in the analog read head signal is used as a threshold value to distinguish between genuine and spurious RDPs.

However, certain patterns in the analog read head signal are more difficult than others to read and/or distinguish genuine from spurious RDPs. A pattern of flux transitions may conveniently be described as a series of 1's and 0's where the 1's, for example, represent transitions on the media and the 0's represent no transitions on the media at a place on the media where a genuine transition could occur. In this example, a 1 represents an RDP while a 0 represents a lack of RDP. In conventional systems, RDPs may genuinely occur at time intervals which are integer multiples of a basic time interval known as one cell time.

One pattern which tends to cause difficulties in accurate detection is known as the isolated tri-bit pattern in which three 1's occur spaced as closely together as the encoding scheme permits. In the analog signal, the first and third 1 would have a first polarity while the second 1 would have the opposite polarity. The resultant analog signal is the summation of these opposite polarity pulses. The central pulse is often substantially attenuated and therefore often missed, or rejected, by conventional amplitude qualifying techniques. The problem of missed central pulses in an isolated tri-bit pattern is aggravated by dropouts as well as low frequency noise which can appear as a baseline shift, that is, a change in the average level of the analog signal peaks.

Conventional approaches to reducing the isolated tri-bit pattern problem in amplitude pulse qualifying techniques include reducing the level of the DC voltage level applied to the hysteresis flip flop by reducing the proportion of the peak amplitude used to define the level and/or the use of slimming filters. Slimming filters, often used in such systems, narrow the peak widths, reducing the effect of the summation of the isolated tri-bit pattern on the amplitude of the central pulse.

Another pattern which tends to cause similar difficulties in accurate detection is known as the low frequency problem in which isolated 1's are separated by many 0's. Such patterns would ideally have a flat area between the isolated 1's, but such flat areas are vulnerable to noise. One conventional technique for reducing the low frequency problem is to change the filter characteristics to fatten the pulses, that is, reducing any slimming filter effects, and/or to increase the hysteresis threshold.

In conventional systems, the filter and hysteresis level settings are therefore often a compromise between minimizing the isolated tri-bit and the low frequency problems. The combined problem is therefore often called the tri-bit low frequency problem.

In addition, magneto-resistive (MR) read heads are replacing conventional inductive read heads. MR heads, however, are more susceptible to the generation of low frequency noise which is difficult to attenuate by filtering. MR heads therefore accentuate difficulties in accurately recovering data, such as those caused by pattern sensitive problems like the tri-bit/low frequency problem.

What are needed therefore are data recovery enhancements providing more reliable qualifications schemes, especially for use with MR heads.

SUMMARY OF THE INVENTION

The preceding and other shortcomings of prior art systems are addressed and overcome by the present invention that provides, in a first aspect, a delay line in the pulse detection signal processing path of a magnetically recorded digital information recovery system so that the undelayed analog signals provide "look ahead" information about the delayed signal being processed. That is, the undelayed signals provide a clear and exact indication of the magnitude and direction of transitions which are about to occur in the delayed analog signal being processed in order to permit more accurate qualification decisions about the validity of pulses being detected in that delayed analog signal. The qualification decisions may be made by comparison between the delayed and undelayed analog signals to detect the high rate of change or high frequency signal transitions which indicate detection of a flux transition, rather than low frequency noise or other unwanted signals.

In another aspect, the present invention provides a read head for generating analog signals related to digital data stored as flux transitions on a magnetic surface separated by a fixed time period, delay line means for generating a replica of the analog signals delayed by one cell time period, means for detecting pulses in the delayed analog signal replica, and a comparator for qualifying pulses in accordance with differences between the analog signals and the delayed replica of the analog signals to enhance the reliability of the pulses so detected.

In a further aspect, the present invention provides a system for recovering magnetically recorded digital information having read head means for generating analog signals in response to flux transitions on magnetic media, delay line means for providing a time delayed replica of said analog signals, pulse detector means for generating pulse detection signals in response to signal characteristics in said time delayed replica indicative of flux transitions in said magnetic media, and means for determining differences between said analog signals and said time delayed replica to reject spurious pulse detection signals.

In another aspect, the present invention provides a method of recovering magnetically recorded digital information by generating analog signals in response to flux transitions on magnetic media, providing a time delayed replica of said analog signals, generating pulse detection signals in response to signal characteristics in said time delayed replica indicative of flux transitions in said magnetic media, and rejecting spurious pulse detection signals in accordance with differences between said analog signals and said time delayed replica.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
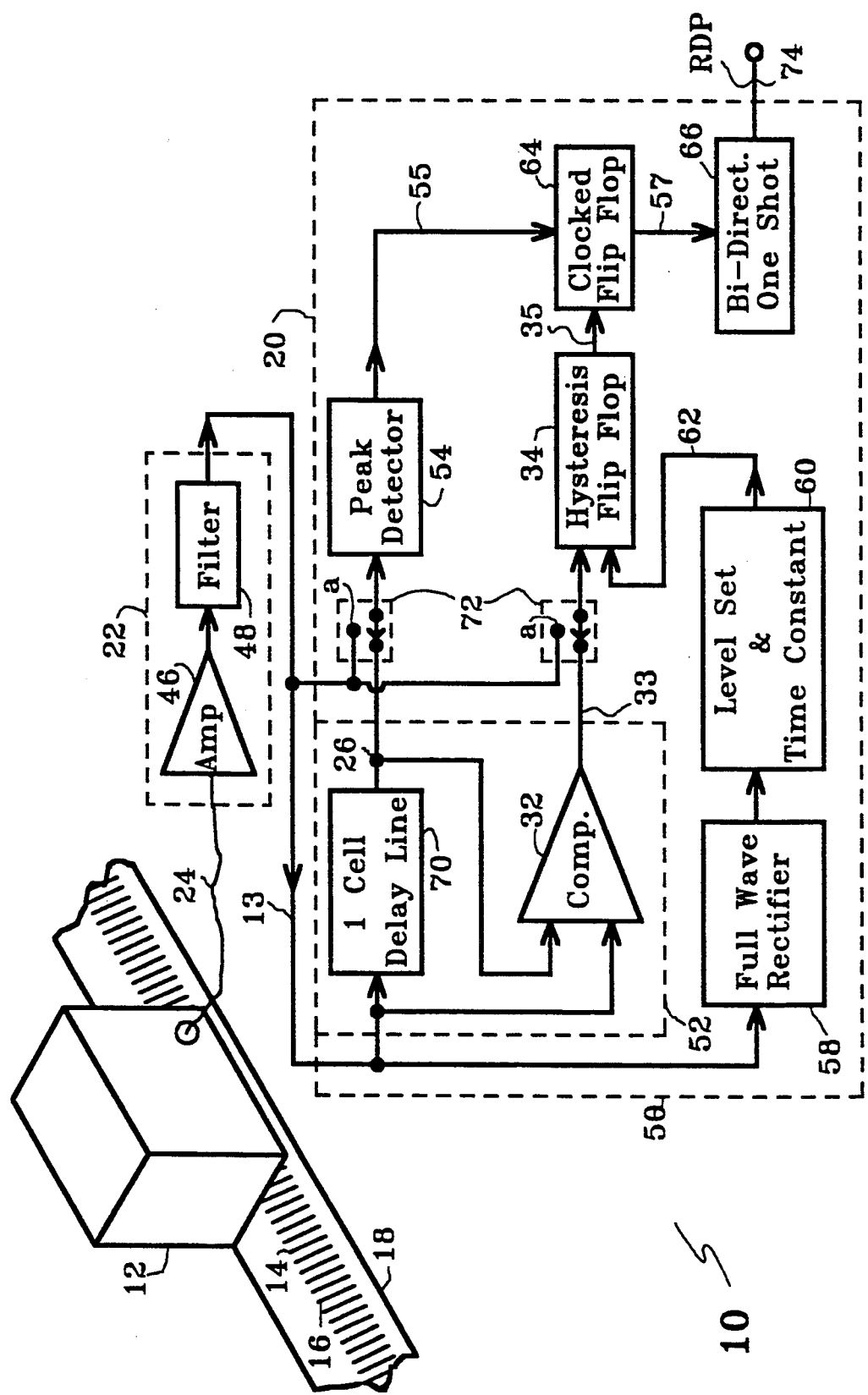
FIG. 1 is a block diagram showing a system according to the present invention for detecting pulses from digital data stored as flux transitions on magnetic media and qualifying the peaks detected to enhance detection reliability.

FIG. 1 is a block diagram showing pulse readout and detection system 10 including read head 12 for generating analog signal 13 in response to the detection of flux transitions 14 representing digital data stored in data track 16 on magnetic media 18. Magnetic media 18 may be a magnetic tape cassette, cartridge, diskette or other magnetic media.

The output of read head 12 is provided to conditioning circuit 22 by means of head cable 24. Conditioning circuit 22 may be a conventional analog head signal conditioning circuit including amplifier 46 and a filter, such as slimming filter 48. The output of conditioning circuit 22 is analog signal 13 which is applied to pulse qualifying system 50 according to the present invention.

Within pulse qualifying system 50, analog signal 13 is applied to look-ahead detector 52, outputs of which are applied to peak detector 54 and hysteresis flip flop 34. Pulse qualifying system 50 may be used in a conventional mode for compatibility with existing systems and, for convenience of understanding, the operation of pulse qualifying system 50 in the conventional mode as a conventional pulse amplitude qualifying circuit will be described first.

To operate pulse qualifying system 50 in the conventional mode, both segments of switch 72 are moved from the position shown in FIG. 1 to position "a". In this conventional mode of operation, look-ahead detector 52 is switched out of the circuit and not included in the signal path of analog signal 13. In particular, when switch 72 is in switch position "a", analog signal 13 is applied directly to peak detector 54 and hysteresis flip flop 34.

Analog signal 13 is also applied to full-wave rectifier 58 the output of which is applied to level set and time constant circuit 60 to provide a slowly varying DC voltage, hysteresis threshold 62, proportional to the peak amplitude in analog signal 13. In a conventional manner, level set and time constant circuit 60 permits hysteresis threshold 62 to decay at a rate related to the cell time between RDPs.

Hysteresis flip flop 34 serves to form positive and negative threshold values, HL and −HL, and generate an output level change whenever, in a conventional pulse amplitude qualifying circuit, analog signal 13 exceeds the appropriate threshold value. The output of hysteresis flip flop 34 is applied as a clocked input to clocked flip flop 64. In such a conventional system, as noted above, analog signal 13 is also applied to peak detector 54 which detects the positive and negative peaks in analog signal 13 to generate detected peak pulse train 55.

Detected peak pulse train 55 from peak detector 54 is applied as the clock input to clocked flip flop 64 so that the output of clocked flip flop 64, qualified peak pulse train 57, changes state when peak detector 54 detects a peak and the peak being detected in analog signal 13 is qualified because it exceeds hysteresis threshold 62 as determined by hysteresis flip flop 34. The output of clocked flip flop 64 is applied to bi-directional one shot 66 to generate a read data pulse or RDP.

Now that the conventional mode of operation of pulse qualifying system 50 has been described, the operation of pulse qualifying system 50 in the look-ahead mode will be described. In the look-ahead mode of operation, switch 72 is in the switch position shown in FIG. 1. Analog signal 13 remains applied directly to full-wave rectifier 58 to generate hysteresis threshold 62 by means of level set and time constant circuit 60 as described above with respect to the conventional mode of operation. In addition, analog signal 13 is applied to look-ahead detector 52 for conditioning before application to hysteresis flip flop 34 and peak detector 54 by means of switch 72.

In particular, within look-ahead detector 52, analog signal 13 is applied to 1 cell delay line 70 to generate delayed analog signal replica 26. 1 cell delay line 70 delays analog signal 13 by one data cell, that is, the time period between successively stored flux transitions 14.

In some encoding schemes, such as Group Code Recording (GCR), the space between 1's can be 1, 2 or 3 cell times. In other codes, the space between 1's can be different, such as in the 1,7 code in which the space between 1's can be 2, 3, 4, 5, 6, 7, or 8 cell times. The delay applied by 1 cell delay line 70 as shown in FIG. 1 is one cell time as would be appropriate for GCR code with one space between 1's. Different delays representing different numbers of cell times would be required for other encoding schemes.

The output of 1 cell delay line 70 is delayed analog signal replica 26 and is applied to peak detector 54 which may be of any convenient conventional design. Analog signal 13 in accordance with the present invention is also applied in look-ahead detector 52 to comparator 32 to generate peak-to-peak differential signal 33. Peak-to-peak differential signal 33 is applied to hysteresis flip flop 34 together with hysteresis threshold 62 so that the qualification of delayed analog signal replica 26 upon peak detection by peak detector 54 is based on the comparison of the difference between the current 1 or 0 and hysteresis threshold 62.

In other words, in accordance with the present invention in pulse readout and detection system 10, analog signal 13 is compared with delayed analog signal replica 26 to detect substantive signal amplitude transitions within a predetermined time period, such as one cell time. Such transitions are detected in comparator 32 which receives analog signal 13 and delayed analog signal replica 26 as inputs. The output of comparator 32 is difference signal 33 which is applied as an input to conventional hysteresis flip flop 34. Hysteresis levels HL and −HL are set in hysteresis flip flop 34 in accordance with hysteresis threshold 62 so that RDP qualifying signal 35 is generated when difference signal 33 exceeds hysteresis threshold 62. In this way, detected peak pulse train 55, which is applied as the clock input to clocked flip flop 64, serves to control the timing of the RDP's from bi-directional one shot 66 qualified by RDP qualifying signal 35. There is therefore no phase shift or peak timing inaccuracies added by the qualifying process and adjustment of the timing of 1 cell delay line 70 may be used to compensate for any other unwanted phase or time shift, such as phase shifts from conditioning circuit 22 and or peak detector 54 if such phase shifts are a problem.

Figure 2:
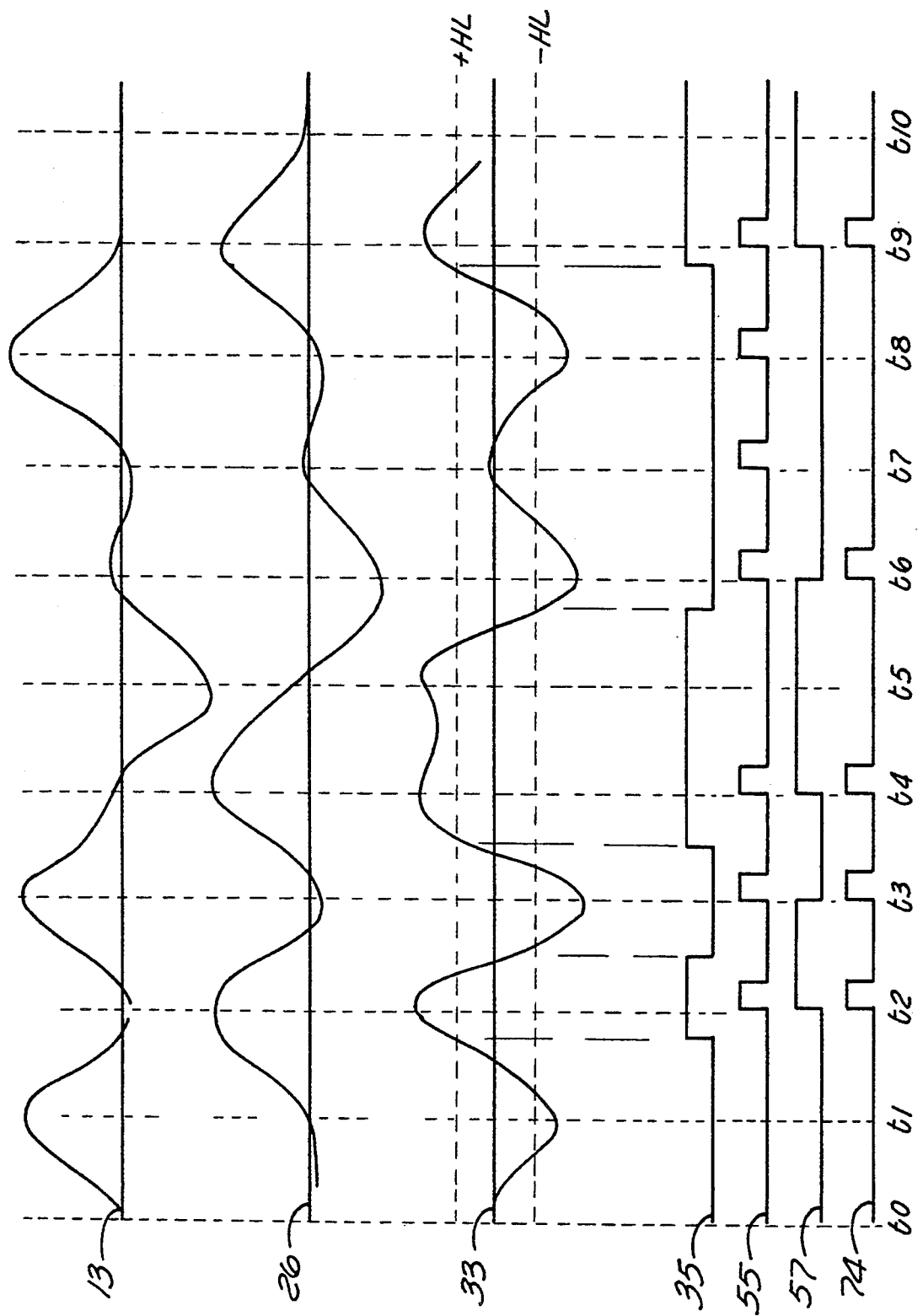
FIG. 2 is a series of graphs on the same time scale showing the signals at several points in signal recovery system 20 of FIG. 1 during the readout and detection of digital data stored on magnetic media.

FIG. 2 is a series of graphs on the same time scale showing the signals at several points in signal recovery system 20 of FIG. 1 during the readout and detection of digital data stored on magnetic media. For convenience, at an initial time $t_0$, analog signal 13, delayed analog signal replica 26, difference signal 33, pulse qualification signal 35, detected peak pulse train 55, qualified peak pulse train 57 and genuine RDP pulse train 74 may all be considered to be at some initialized state, such as zero.

Time $t_1$ occurs one data cell or time period after time $t_0$. Analog signal 13 from read head 12 has reached a positive peak at time $t_1$ potentially indicating that a flux transition has occurred and a pulse has been detected. Because delay line 70 provides a signal delay exactly equal to one time cell or period, delayed analog signal replica 26 at time $t_1$ equals the value of analog signal 13 at time $t_0$, that is, zero.

The difference between analog signal 13 and delayed analog signal replica 26 at time $t_1$ as indicated by difference signal 33 is therefore large, exceeding the level set by level set and time constant circuit 60 at some time before time $t_1$ depending on the proportionality factor used for setting the level. Therefore difference signal 33 has exceeded hysteresis threshold level HL in hysteresis flip flop 34 by time $t_1$ so that RDP qualifying signal 35 has been generated.

By time $t_2$, analog signal 13 has reached a negative peak while delayed analog signal replica 26 has increased to the positive peak value of analog signal 13 at time $t_1$. Because both analog signal 13 and delayed analog signal replica 26 are continuing to increase in the same directions they had been increasing, the difference therebetween, shown in difference signal 33, continues to increase, remaining above hysteresis level HL at time $t_2$.

Delayed analog signal replica 26 is applied to peak detector 54 in the look-ahead mode of operation shown in FIG. 1 so that the peak in delayed analog signal replica 26 appearing at time $t_2$ is detected and appears in detected peak pulse train 55 at this time. This pulse is qualified at time $t_2$ as indicated by the state of RDP qualifying signal 35 so that a change in state appears at this time in qualified peak pulse train 57 at the output of clocked flip flop 64. A pulse therefore appears at time $t_2$ in genuine RDP pulse train 74 indicating the reading and detection of a genuine RDP in delayed analog signal replica 26.

Before time $t_3$, analog signal 13 has returned from its negative peak towards zero while delayed analog signal replica 26, one cell period behind, will reach its negative peak at time $t_3$. If this peak represents a genuine peak, such as the central peak in a tri-bit pattern, level set and time constant circuit 60 should be adjusted so that difference signal 33 exceeds −HL before time $t_3$. Hysteresis flip flop 34 causes RDP qualifying signal 35 to change levels when difference signal 33 exceeds −HL in preparation for the detection and qualification of the next peak.

Before time $t_4$, analog signal 13 is decaying from its second positive peak while delayed analog signal replica 26, one cell period behind, is decaying from its negative peak so that difference signal 33 drops below −HL, resetting RDP qualifying signal 35. At time $t_4$, delayed analog signal replica 26 reaches its second positive peak as indicated by the pulse in detected peak pulse train 55 at time $t_4$. This pulse is qualified because of the recent transition in RDP qualifying signal 35 so a pulse appears in qualified peak pulse train 57 and is processed by bi-directional one shot 66 to provide an RDP at time $t_4$ in genuine RDP pulse train 74.

Analog signal 13 from time period $t_0$ to time $t_4$ has a pair of closely spaced pulses at times $t_1$ and $t_3$ of one polarity, positive, separated by a pulse at time $t_2$ of the opposite polarity, negative. This pattern represents the tri-bit low pattern which is difficult to detect and qualify while also avoiding the low frequency problem. The genuine peaks in analog signal 13 at times $t_1$, $t_2$ and $t_3$ are delayed by look-ahead detector 52 so that they occur in delayed analog signal replica 26 at times $t_2$, $t_3$ and $t_4$. As described above, these genuine peaks appear in detected peak pulse train 55 and are properly qualified as shown by level transitions in RDP qualifying signal 35 so that they appear as level shifts in qualified peak pulse train 57 which are converted to genuine RDPs at times $t_2$, $t_3$ and $t_4$ as shown in genuine RDP pulse train 74.

In addition to proper operation with regard to the tri-bit pattern problem, pulse readout and detection system 10 of the present invention also handles the low frequency problem discussed above in which genuine peaks are separated by a substantial time period during which baseline shifts or other low frequency noise problems may otherwise cause the appearance of spurious peaks which must be distinguished and disqualified.

In particular, such genuine peaks occur in analog signal 13 which appear as peaks in delayed analog signal replica 26 at times $t_6$ and $t_9$. In addition, however, spurious peaks are also detected and appear in detected peak pulse train 55 at times $t_7$ and $t_8$ because of the influence of low frequency noise occurring in the relatively long interval between times $t_5$ and $t_8$ during which level set and time constant circuit 60 causes the threshold levels to decay.

For the purposes of illustration, the time period between the true positive peak in analog signal 13 at time $t_3$ and the true negative peak in analog signal 13 at time $t_5$ is shown without any low frequency drift or noise. The period between times $t_5$ and $t_8$, however, includes he common low frequency noise or drift problem, especially noticeable with MR heads. Without low frequency problems analog signal 13 would be approximately zero between times $t_5$ and $t_8$, but it may well overshoot zero on the way back up from the negative peak at time $t_5$ and then drop below zero before increasing towards its genuine peak at time $t_8$.

As noted above, delayed analog signal replica 26 is an exact but delayed replica of analog signal 13 so that a peak is detected in delayed analog signal replica 26 by peak detector 54 at time $t_6$ as indicated in detected peak pulse train 55. Similarly, a peak is detected in delayed analog signal replica 26 by peak detector 54 at time $t_9$ as indicated in detected peak pulse train 55. However, the low frequency problem causes changes in the signals so that, especially during periods without peaks, drifts may occur so that difference signal 33 crosses hysteresis level HL or hysteresis level −HL even though the peak detected was spurious. In particular, peaks appear in detected peak pulse train 55 at time $t_7$ and time $t_8$ representing peaks in delayed analog signal replica 26 even though no flux transitions were detected by read head 12 at times $t_6$ and $t_7$.

However, because difference signal 33 is the difference between analog signal 13 and delayed analog signal replica 26, that is, the difference between the signal and its delayed replica, hysteresis flip flop 34 is able to properly qualify these pulses so that transitions appear in RDP qualifying signal 35 only before time $t_6$ and time $t_7$ to qualify the genuine peaks.

In particular, only the peaks in detected peak pulse train 55 at times $t_6$ and $t_9$ are qualified and provide transitions in qualified peak pulse train 57 so that genuine RDPs appear at times $t_6$ and $t_9$ while the spurious peaks at times $t_7$ and $t_8$ are not passed through clocked flip flop 64.

It is important to note that pulse recovery occurs at the time of the detection of a peak in delayed analog signal replica 26, rather than at the occurrence of a peak in analog signal 13. However, there is no distortion due to the signal delay caused by 1 cell delay line 70 between analog signal 13 and delayed analog signal replica 26. Therefore, there will be no difference in the relative times of occurrence of peaks or pulses in detected peak pulse train 55 detected from delayed analog signal replica 26 from pulses detected in analog signal 13.

While this invention has been described with reference to its presently preferred embodiment(s), its scope is not limited thereto. Rather, such scope is only limited insofar as defined by the following set of claims and all equivalents thereof.

What is claimed is:

1. A system for recovering magnetically recorded digital information, comprising:

read head means for generating analog signals in response to flux transitions on magnetic media, said flux transitions separated by a time period at least equal to a time period of one data cell;

delay line means for providing a replica of said analog signals delayed in time by a fixed time period equal to at least the time period of one data cell;

peak detector means for generating peak detection signals in response to signal characteristics in said time delayed replica indicative of flux transitions in said magnetic media;

comparator means for providing differences in peak-to-peak amplitudes between said analog signals and said time delayed replica;

hysteresis circuit means responsive to said differences for generating a qualifying signal transition whenever said differences exceed a predetermined level; and gating means for rejecting peak detection signals which do not occur after a qualifying signal transition.

2. A method of recovering magnetically recorded digital information, comprising the steps of:

generating analog signals in response to flux transitions on magnetic media, said flux transitions separated by a time period at least equal to a time period of one data cell;

providing a replica of said analog signals delayed in time by a fixed time period equal to at least the time period of one data cell;

generating peak detection signals in response to signal characteristics in said time delayed replica indicative of flux transitions in said magnetic media;

generating a differential signal based upon differences in peak-to-peak amplitudes between said analog signals and said time delayed replica;

generating a qualifying signal transition whenever said differential signal exceeds a predetermined threshold level; and rejecting peak detection signals which do not occur after a qualifying signal transition.

3. A system for recovering magnetically recorded digital information, comprising:

means for generating analog signals in response to flux transitions on magnetic media, said flux transitions separated by a time period at least equal to a time period of one data cell;

means for providing a replica of said analog signals delayed in time by a fixed time period equal to at least the time period of one data cell;

means for generating peak detection signals in response to changes in said time delayed replica indicative of flux transitions in said magnetic media;

means for qualifying differences between peak-to-peak amplitudes of said analog signals and said replica to produce a gating signal; and means for gating peak detection signals based upon said gating signal.

4. The system claimed in claim 3 wherein said qualifying means further comprises:

means responsive to the analog signal for producing a level signal related to the peak-to-peak amplitude of the analog signal; and hysteresis flip flop means for generating the gating signal when said differences in peak-to-peak amplitudes between said analog signals and said time delayed replica exceed threshold values equal to said level signal.

5. The system claimed in claim 3 wherein said means for gating peak detection signals further comprises:

clocked flip flop means responsive to the qualifying signal for gating the peak detection signals.

6. A method of recovering magnetically recorded digital information, comprising the steps of:

generating analog signals in response to flux transitions on magnetic media, said flux transitions separated by a time period at least equal to a time period of one data cell;

providing a replica of said analog signals delayed in time by a fixed time period equal to at least the time period of one data cell;

generating peak detection signals in response to changes in said time delayed replica indicative of flux transitions in said magnetic media;

determining differences in peak-to-peak amplitudes between said analog signals and said time delayed replica; and qualifying said differences in peak-to-peak amplitudes between said analog signals and said time delayed replica to reject peak detection signals.

7. The method claimed in claim 6 wherein said step of generating a qualifying signal further comprises the steps of:

producing a level signal related to the peak-to-peak amplitude of the analog signal; and generating the qualifying signal when said determined differences in peak-to-peak amplitudes between said analog signals and said time delayed replica exceed threshold values equal to said level signal.

8. The method claimed in claim 6 wherein said step of rejecting peak detection signals further comprises the step of:

gating the peak detection signals in response to the qualifying signal.

9. A system for recovering magnetically recorded digital information, comprising:

read head means for generating an analog signal in response to positive and negative flux transitions on magnetic media, said flux transitions separated by a time period equal to about the time period of one data cell;

amplifier means for amplifying the output of said read head means and for generating an analog signal related to said flux transitions; and a pulse qualifying circuit comprising:

detector circuit means having a delay circuit with a delay for generating a delayed replica signal related to said analog signal, said delay being a function of an encoding scheme of data recorded in the media, and comparator circuit means for determining a peak-to-peak differential signal from said replica signal;

a peak detector circuit means for detecting the positive and negative peaks in said replica signal and for generating a detected pulse signal related to said replica signal;

a threshold detector means for comparing said peak-to-peak differential signal to a positive and a negative threshold value and for generating an output transition whenever the amplitude of said peak-to-peak differential signal exceeds one of said threshold values; and circuit means having a clock input coupled to the output of said threshold detector means and a data input coupled to the output of said peak detector circuit means for gating said output transitions from said threshold detector means to the output of said circuit means in response to said detected pulse signal.

10. A system for recovering magnetically recorded digital information, comprising:

means for generating analog signals in response to flux transitions stored in data cells on magnetic media, including means for providing a first analog signal from a first data cell and a second analog signal from a second data cell;

peak detector means for generating peak detection signals in response to signal characteristics in said analog signals indicative of flux transitions in said magnetic media;

means determining differences between said first analog signal from said first data cell and said second analog signal from said second data cell and qualifying said differences for rejection of spurious peak detection signals.

11. The system claimed in claim 10 wherein said means for determining differences between said first and second analog signals further comprises:

means for rejecting peak detection signals generated by said peak detector means at times at which the difference in peak-to-peak amplitudes between said first and second analog signals indicates spurious peak detection signals.

12. The system claimed in claim 10 wherein said means for determining differences between said first and second analog signals further comprises:

means for rejecting peak detection signals generated by said peak detector means at times at which the difference between respective predetermined points of said first and second analog signals does not exceed a predetermined level.

13. The system claimed in claim 10 wherein said means for determining differences between said first and second analog signals further comprises:

comparator means for determining differences in peak-to-peak amplitudes between said first and second analog signals;

hysteresis flip flop means for generating a signal transition whenever said differences exceed a predetermined level; and gating means for rejecting peak detection signals which do not occur after a qualifying signal transition.

14. A method of recovering magnetically recorded digital information, comprising the steps of:

generating analog signals in response to flux transitions stored in data cells on magnetic media;

receiving a first one of said analog signals corresponding to a first one of said data cells and a second one of said analog signals corresponding to a second one of said data cells;

generating peak detection signals in response to signal characteristics in said analog signals indicative of flux transitions in said magnetic media;

generating a differential signal from differences between said first one analog signal of said first one data cell and said second one analog signal of said second one data cell; and qualifying said differential signal to determine whether a peak detection signal corresponding to said first one analog signal is a spurious signal.

15. The method claimed in claim 14 wherein said step of qualifying said differential signal further comprises the step of:

rejecting peak detection signals generated at times at which the differences in peak-to-peak amplitudes between said first and second analog signals indicate spurious peak detection signals.

16. The method claimed in claim 14 wherein said step of qualifying said differential signal further comprises the step of:

rejecting peak detection signals at times at which the difference in peak-to-peak amplitudes between said first and second analog signals does not exceed a predetermined level.

17. The method claimed in claim 14 wherein said step qualifying further comprises the steps of:

determining the difference in peak-to-peak amplitudes between said first and second analog signals and said time delayed replica;

generating a qualifying signal transition whenever said difference in peak-to-peak amplitudes exceeds a predetermined level; and rejecting peak detection signals which do not occur after a qualifying signal transition.

* * * * *